United States Patent [19]

Goel

[11] Patent Number: 4,775,734

[45] Date of Patent: Oct. 4, 1988

[54] NON-NUCLEOPHILIC ACID SALTS OF AMINES AS CURE ACCELERATORS

[75] Inventor: Anil B. Goel, Worthington, Ohio

[73] Assignee: Ashland Oil, Inc., Ashland, Ky.

[21] Appl. No.: 84,350

[22] Filed: Aug. 12, 1987

[51] Int. Cl.$^4$ .............................................. C08G 59/68

[52] U.S. Cl. ........................................ 528/89; 528/91; 528/92; 528/93; 528/361; 528/407; 528/408

[58] Field of Search ...................... 528/88, 89, 91, 92, 528/361, 407

[56] References Cited

U.S. PATENT DOCUMENTS

| | | | |
|---|---|---|---|
| 3,720,634 | 3/1973 | Statton | 528/89 |
| 3,909,480 | 9/1975 | Ogata et al. | 528/91 X |
| 4,000,115 | 12/1976 | Jacobs | 528/89 X |
| 4,092,296 | 5/1978 | Skiff | 528/91 |
| 4,396,754 | 8/1983 | Brownscombe | 528/91 X |
| 4,668,758 | 5/1987 | Corley | 528/91 |

*Primary Examiner*—Earl Nielsen
*Attorney, Agent, or Firm*—John F. Jones

[57] ABSTRACT

A curable composition comprising a polyepoxide, an amine curing agent and a catalytic amount of a non-nucleophilic acid salt of an amine having the formula $R(R')(R'')NH^+X^-$ wherein R, R' and R'' independently represent an alkyl group having from 1 to 20 carbon atoms, an alkaryl group having from 7 to 20 carbon atoms or an oxyalkylene group having from 2 to 50 carbon atoms and wherein R' and R'' independently also may represent hydrogen and R may also represent the formula $[-Y-(R')(R'')NH^+X^-]_n$ wherein R' and R'' have the foregoing designations, Y represents an alkylene or alkylene ether group having from 2 to 50 carbon atoms and n represents an integer of from 1 to 5 is described.

14 Claims, No Drawings

NON-NUCLEOPHILIC ACID SALTS OF AMINES AS CURE ACCELERATORS

This invention relates to a process for curing epoxy resin-amine hardener mixtures at a rapid rate by inclusion in said mixtures of a catalytic amount of a Non-Nucleophilic Acid salt of an amine.

The use of aromatic and aliphatic polyamines (primary, secondary, mixed primary and secondary, and combinations of these with tertiary amines) and amido amines therefrom as hardening or curing agents for epoxy resins is well known. In order to improve the cure rate of the amine-epoxy resin formulations of the prior art various types of cure accelerators including tertiary amines, phenolics, quaternary ammonium salts of strong acids, metal salts of carboxylic acids, boron trifluoride-amine complexes and boron trifluoride-phenol complexes, mercaptans and thioether alcohols have been used in the prior art (See article by Mika in "Epoxy Resins Chemistry and Technology," edited by May and Tanaka, Marcel Dekker, Inc., New York, 1973). For instance, U.S. Pat. Nos. 3,265,66 and 3,271,350 describe the use of guanamine, U.S. Pat. No. 3,637,591 describes the use of neutral esters of a phosphorus acid, U.S. Pat. No. 2,909,494 describes the use of a boron trifluoride-amine, U.S. Pat. No. 4,554,342 describes the use of trihydrocarbyl sulfonium salt, U.S. Pat. No. 4,110,313 describes the use of dithiocarbamate salt and U.S. Pat. No. 4,195,153 describes the use of an amino alcohol as an accelerator for the amine curing of epoxy resins. U.S. Pat. No. 3,903,048 describes the use of dimethyl dithiocarbamic acid dimethyl ammonium salt, bis(dimethyl thiocarbamyl) sulfide, tetramethylthiuram disulfide and the like as catalyst systems for lowering epoxy resin cure temperatures when cured with dicyandiamide. The use of a tertiary amine salt of thiocyanic acid as an amine cure accelerator has been shown in U.S. Pat. Nos. 3,642,649 and 4,161,575. Quaternary ammonium (tetra alkylammonium) thiocyanate as accelerators for epoxy resins has been shown in U.S. Pat. No. 3,660,354. The use of alkali and alkaline earth metal thiocyanate salts with aminoethylpiperazine as curing agent for epoxy resins has been shown in Japanese Patent 597823 [Chem. Abstracts 101 (20) 172392Z]. Similarly, epoxy curing with polyamine/thiourea has been disclosed in Japanese Patent 48092437. In addition to the amine curing of epoxy resin accelerated by certain catalysts, rapid room temperature curing of epoxy resins has been disclosed in the prior art using metal salts of non-nucleophilic acids (cationic catalysts), as well as photoinitiators such as diaryl iodonium and sulfonium salts. U.S. Pat. No. 4,092,296 describes the use of metallic fluoroborate salts such as the tin, copper, zinc, nickel and lead salt; U.S. Pat. No. 4,396,754 describes the use of alkali and alkaline earth metal salts of non-nucleophilic acids such as lithium fluoroborate, calcium fluoroborate, etc. and U.S. Pat. No. 4,565,837 describes the use of carbenium fluoroborate salts as epoxy curing agent. Various publications including U.S. Pat. Nos. 4,069,054; 4,069,055; 4,138,255; 4,175,972; 4,175,973; 4,367,261; 4,374,066; 4,398,014; 4,399,071 and 4,417,061 describe the use of photoinitiators such as diaryl iodonium and diaryl sulfonium salts to cure epoxy compositions.

Thus, it is quite apparent that the rapid curing of epoxy resins has been the subject of much industrial interest. Although the prior art cure accelerators improve the cure speed of epoxy resins cured with amine hardeners, there are certain limitations associated therewith.

The use of accelerators such as mercaptans and thioethers is not always desirable because have unpleasant odors. Certain accelerators such as boron trifluoride-amine complexes and boron trifluoride- phenol complexes are corrosive and esters of phosphorus acid and metal carboxylates are moisture sensitive. Some of the prior art accelerators are not very efficient and promote acceleration only mildly. In addition to this, most prior art accelerators either copolymerize with epoxy resins or catalyze the homopolymerization of epoxy resins. Examples of such catalysts are tertiary amines, boron trifluoride-amine salts and metal carboxylates.

The acceleration of cure with catalysts prepared by the reaction of amines with ammonium tetrafluoroborate in the cure of epoxide resin-amine hardener formulations has not previously been disclosed.

The objective of the present invention is to provide a new class of cure accelerators which are free from the above-described limitations associated with the prior art described accelerators and which do not cure epoxy resins themselves but provide high cure acceleration of the amine curing of epoxy resins.

I have discovered that the aliphatic mono-, di-, or polyamines (primary, secondary, tertiary, or mixed primary and secondary, or these mixed with tertiary amines) salts of non-nucleophilic acids having the formula $R(R')(R'')NH^+X^-$ wherein R, R' and R'' independently represent an alkyl group having from 1 to 20 carbon atoms, an alkaryl group having from 7 to 20 carbon atoms or an oxyalkylene group having from two to fifty carbon atoms and wherein R' and R'' independently also may represent hydrogen, and R may also represent the formula $[-Y-(R')(R'')NH^+X^-]_n$ wherein R' and R'' have the foregoing designations, Y represents an alkylene or alkylene ether group having from 2 to 50 carbon atoms and n is an integer of 1 to 5 and X is selected from the group consisting of $BF_4$, $PF_6$, $AsF_6$, $SbF_6$, and $BPh_4$, wherein Ph represents a phenyl group, are excellent cure accelerators for the amine curing of epoxy resins.

The catalysts or cure accelerators of the present invention differ from those of the prior art metal salts of non-nucleophilic acids in that the former are either completely inactive or exhibit very poor activity towards the epoxy resins themselves in the absence of the amine hardener. On the other hand, the prior art metal salts of non-nucleophilic acids are themselves curing agents for epoxy resins, per se, and the addition of small amounts of amines to these catalysts results in poisoning of their catalytic activity.

The cure accelerators embodied in the process of this invention may be prepared either by the reaction of an amine with non-nucleophilic acids or by the interaction of the amines with ammonium salts of the non-nucleophilic acids. In the latter case, ammonia displacement reaction occurs which proceeds slowly at ambient temperatures and rapidly at moderately elevated temperatures (below 150° C.). The stoichiometric reaction of one mole of the ammonium salt, for instance, ammonium tetrafluoroborate per amino group of the amine results in the formation of the cure accelerator.

The cure accelerators of this invention may also be prepared conveniently in situ by simply reacting ammonium tetrafluoroborate with excess of amine; thus, the recommended stoichiometry for the synthesis of these catalysts is always one or more amine group per mole of ammonium salt of the non-nucleophilic acid. The amine salts by themselves, have been found to be either inactive towards the curing of epoxy resins or exhibit extremely poor and slow reactivity at ambient-to-moderately elevated temperature (below 120° C.). However, these salts, when added to the epoxy compositions containing amines and amido amine curing agents which may also contain other optionally known accelerators (such as phenolics, mercaptans and other thio group containing accelerators described in the prior art) cure rapidly at ambient temperatures, as well as at low-to-moderately elevated temperatures (above ambient to about 150° C.). The catalysts of this invention accelerate the epoxy curing reactions with amine hardeners to such an extent that small amounts (from 0.2 to 20% by weight of the total epoxy resin composition and preferably from 1 to 10% by weight) of catalyst is needed to reduce the cure time several fold. For instance, the reaction of a liquid diglycidyl ether of Bisphenol-A with 20% by weight of aminoethylpiperazine of the weight of the total composition which required about 50 minutes to cure at room temperature to give a gelled product, on the other hand when carried out in the presence of 5% by weight based on the total epoxy resin/amine composition of the aminoethylpiperazine tetrafluoroborate salt (prepared by the reaction of ammonium tetrafluoroborate with aminoethylpiperazine) the curing occurs within seven minutes of mixing at room temperature or about seven times faster.

Another important feature of these catalysts is their ability to promote the cure acceleration of epoxy resins cured with amine hardeners containing other conventional cure accelerators.

The epoxy resins or polyepoxides useful in the practice of this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like.

Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

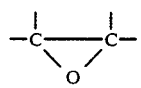

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexane diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The types of amines most useful in the curing of the epoxy resins include mono-, di-, and polyamines containing primary, secondary, tertiary, mixed primary and secondary and combinations of these with tertiary amines and the amido amines obtainable from these amines by reaction with carboxylic acids. The amines and amido amines may also contain other functionalities such as ether, thioether, urea and the like groups. Typical examples of such amines are butylamine, dodecylamines, cyclohexylamine, ethylene diamine, diethylene triamine, triethylene tetramine, tetraethylene pentamine and the like, propylene diamine, dipropylene triamine and the like, cyclohexane dimethyl diamine, xylene diamine, hexamethylene diamine, isophorone diamine, triethylamine, tripropylamine, triethylene diamine, tris (amino ethyl) amine, tris (amino propyl) amine, aminoethylpiperazine, bis(amino propyl) piperazine, piperidine, N-alkyl piperidine, morpholine, N-alkylmorpholine, dimer acid diamine and the like, imidazoles and imidazolines, and other heterocyclic compounds and poly (oxy alkylene) polyamines. These catalysts, in combination with the amines, amido amines and amines with phenolics and mercaptans may be used in epoxy formulations useful in applications such as coatings adhesives, reaction injection molding (RIM), reinforced plastics, composites, potting compounds, tooling compounds, injection molding, sheet molding compounds and the like.

The catalysts of this invention may be dissolved or dispersed in the amine hardener and if desired, may also be encapsulated in either thermoplastic materials or by reacting with reactive molecules such as isocyanate, epoxide and other techniques known in the prior art. The epoxy resin compositions embodied in this invention may also include additives such as plasticizers, diluents, solvents, fillers, antioxidants, colorants and the like.

This invention is further illustrated in the following representative examples.

EXAMPLE 1

An amine fluoroborate catalyst (cure accelerator) was prepared in situ by reacting 1.5g of powdered ammonium tetrafluoroborate with 30 g of aminoethylpiperazine at 110° C. for 15 minutes. Ammonia gas evolution occurred to give a clear solution which was flushed with dry nitrogren followed by degassing under reduced pressure to ensure the removal of dissolved ammonia. The resulting liquid hardener containing the fluoroborate salt catalyst was used for curing of epoxy resins. In a typical experiment, 12 g of the liquid diglycidyl ether of Bisphenol-A (DGEBPA; epoxy equivalent weight of 180–195) was mixed with 3 g of the aminoethylpiperazine hardener containing the fluoroborate catalyst described just above. The resulting mixture was kept at room temperature and gelation occurred within seven minutes accompanied with an exothermic reaction to give a solid thermoset polymer.

EXAMPLE 2

This example is for purposes of comparison and is otherwise outside the scope of the present invention. In order to demonstrate that the use of an amine hardener such as aminoethylpiperazine without the fluoroborate catalyst gives a much slower cure, the procedure of Example 1 was followed using 12 g of DGEBPA and 3 g of aminoethylpiperazine. Curing occurred at room temperature in about 51 minutes to give a solid thermoset polymer.

In another experiment, 10 g of DGEBPA was mixed with 0.2 g of ammonium tetrafluoroborate and the resulting mixture was heated at 120° C. No gelation occurred in 15 minutes showing that ammonium tetrafluoroborate is either inactive or is an extremely poor curing agent for epoxy resins.

In another experiment 10 g of DGEPA was mixed with 0.2 g of lithium tetrafluoroborate catalyst (See U.S. Pat. No. 4,396,754). Upon heating the mixture at 110° C., gelation occurred within one minute to give a solid polymer. This demonstrates that the prior art fluoroborate catalyst promotes the homopolymerization of epoxy resins.

In another experiment, a mixture of 10 g of DGEBPA and 0.2 g of lithium tetrafluoroborate was mixed with 0.3 g of aminoethylpiperazine and the mixture was heated at 110° C. No gelation occurred in 10 minutes of heating, indicating that the prior art metal fluoroborate catalyst became inactive (or was of significantly reduced activity) upon the addition of an amine hardener to the mixture.

EXAMPLE 3

The procedure of Example 1 was followed to prepare the amine fluoroborate catalyst in situ by reaction of 1.73 g of powdered ammonium tetrafluoroborate with 30 g of diethylene triamine. A part (3 g) of this solution was mixed with 12 g of DGEBPA and the mixture was kept at room temperature. Gelation occurred in about 15 minutes to give a hard, solid polymer. When another similar mixture was heated at 120° C. gelatin occurred in 35 seconds.

In a comparative experiment which is outside the scope of this invention, when 12 g of DGEBPA was mixed with 3 g of diethylene triamine and the resulting mixture was stored at room temperature, gelation occurred in about 45 minutes.

EXAMPLE 4

The procedure of Example 1 was followed by reacting 1.7 g of ammonium tetrafluoroborate with 30 g of ethylene diamine to give a solution. A 3.0 g portion of this solution was found to cure DGEBPA (12 g) at room temperature in 12 minutes and at 120° C. in 30 seconds. In comparison, a mixture of 3 g of ethylene diamine and 12 g of DGEBPA cured at room temperature in 43 minutes and at 120° C. in one minute.

EXAMPLE 5

The procedure of Example 1 was followed by reacting 2.5 g of ammonium tetrafluoroborate with 47.5 g of triethylene tetramine to give a liquid hardener solution. This hardener (3 g) was found to cure the diepoxide resin, DGEBPA (12 g), at room temperature in 18 minutes and at 120° C. in 40 seconds. In comparison, a solution of 12 g of DGEBPA and 3 g of triethylene tetramine was found to gel in 69 minutes at room temperature and in one minute at 120° C.

EXAMPLE 6

The procedure of Example 1 was followed using 1.7 g of ammonium tetrafluoroborate and 30 g of an amido amine having active hydrogen equivalent weight of 90 obtained by amidation of linoleic acid with ethylene diamine, to give a hardener solution containing catalyst. This material (5 g) was found to cure DGEBPA (10 g) at room temperature in about one hour and 30 minutes and at 120° C. in one minute and 40 seconds. In comparison, a solution of 10 g of DGEBPA and 5 g of the amido amine with no catalyst required greater than six hours (overnight) at room temperature and four minutes and ten seconds at 120° C. to give gelation.

EXAMPLE 7

The tetrafluoroborate salt of morpholine was prepared by reacting 1.04 g of ammonium tetrafluoroborate and 0.93 g of morpholine at 100° C. for 20 minutes, followed by degassing to give a crystalline solid product. A 0.5 g sample of this catalyst was mixed with 2.5 g of aminoethylpiperazine and the resulting hardener was added to 12 g of the diglycidyl ether of Bisphenol-A at room temperature. Gelation occurred in six minutes to give a solid polymer.

EXAMPLE 8

A solution of 10 g of DGEBPA and 2 g of the diglycidyl ether of poly (oxypropylene) glycol (epoxy equivalent weight of 320) was mixed with 3.0 g of the liquid hardener containing catalyst of Example 1. The resulting mixture which was found to have a cure time of eight minutes at room temperature was applied to the surface of a zinc phosphatized steel plate in the form of a 1 mil thick coating. The coating was then cured at 110° C. for ten minutes to give a non-tacky, very glossy coating having pencil hardness (ASTM D-3363) of 2H and showed 100% adhesion (tape Adhesion test, ASTM D-3359) and passed reverse impact test (ASTM D-2794) of 50 inches/pound.

EXAMPLE 9

A tetrafluoroborate catalyst of imidazoline was prepared by heating 2.1 g of ammonium tetrafluoroborate with 1.9 g of imidazoline at 110° C. for 20 minutes, followed by degassing under reduced pressure. A portion of this material (0.5 g) was mixed with 2.5 g of aminoethylpiperazine and the resulting mixture was added to 12 g of DGEBPA. The final mixture gelled at room temperature in four minutes to give a solid polymer. In comparison, a solution of 12 g of DGEBPA, 2.5 g of aminoethylpiperazine and 0.4 g of imidazoline gelled in 53 minutes.

EXAMPLE 10

A tetrafluoroborate catalyst of imidazine was prepared by heating 2.1 g of ammonium tetrafluoroborate with 1.9 g of imidazine. A portion (0.5 g) of this material was mixed with 2.5 g of aminoethylpiperazine and 12 g of DGEBPA and the resulting mixture gelled in five minutes at room temperature.

EXAMPLE 11

The catalyst-containing hardener solution described in Example 1 (2.7 g) was mixed with 0.4 g of Bisphenol-A and heated at 100° C. for 15 minutes to give a new hardener composition. This material was mixed with 12 g of DGEBPA at room temperature. The resulting mixture was found to gel in five minutes which is less time than was required in Example 1, indicating that the curing rate of amine hardeners can further be improved by using the combination of phenolic and tetrafluoroborate-amine complexes of this invention as accelerators.

EXAMPLE 12

The hexafluorophosphate salt of aminoethylpiperazine was prepared in situ by mixing and heating at 100° C. for one hour 0.6 g of ammonium hexafluorophosphate and 10 g of aminoethylpiperazine. The resulting clear solution was degassed at reduced pressure and was used as curing agent-accelerator for curing epoxy resins. In a typical experiment, 12 g of DGEBPA was mixed with 3 g of the foregoing solution and the resulting mixture gelled in 7.5 minutes at room temperature to give a solid, thermoset product.

EXAMPLE 13

The hexafluorophosphate salt of poly(oxypropylene) triamine (molecular weight of about 400) was prepared in situ by heating at 100° C. for 1 hour a mixture of 1.5 g of ammonium hexafluorophosphate and 20 g of the poly(oxypropylene) triamine. The resulting solution was degassed and used as curing agent-accelerator. Typically, 4 g of this solution was mixed with 10 g of DGEBPA and the resulting mixture was heated at 122° C. At this temperature the mixture gelled in 2.3 minutes to give a solid, thermoset polymer.

EXAMPLE 14

The hexafluorophosphate salt of diethylamine was prepared by heating 2.19 g of diethylamine with 1.03 g of ammonium hexafluorophosphate at 110° C. for 1 hour during which time ammonia gas evolved from the mixture. The addition of 1 g. of this product accelerator to 2 g of diethylene triamine gave an amine-hardener-accelerator mixture which when mixed with 12 g of DGEBPA gave a gelled polymeric product in 10 minutes at room temperature.

I claim:

1. A curable composition comprising a polyepoxide, an amine curing agent and a catalytic amount of a member selected from the group consisting of the tetrafluoroborate salt of aminoethylpiperazine, the tetrafluoroborate salt of diethylene triamine, the tetrafluoroborate salt of ethylene diamine, the tetrafluoroborate salt of triethylene tetramine, the tetrafluoroborate salt of an amido amine obtained by amidification of linoleic acid with ethylene diamine, the tetrafluoroborate salt of morpholine, the hexafluorophosphate salt of aminoethylpiperazine, the hexafluorophosphate salt of poly(oxy propylene) triamine and the hexafluorophospate salt of diethyl amine.

2. The composition of claim 1 wherein the amine curing agent is selected from the group consisting of butylamine, dodecylamines, cyclohexyl amine, ethylene diamine, diethylene triamine, triethylene tetramine, tetraethylene pentamine, propylene diamine, dipropylene triamine, cyclohexane diamine, xylene diamine, hexamethylene diamine, triethylamine, tripropylamine, triethylene diamine, tris(amino ethyl) amine, tris(aminopropyl) amine, aminoethylpiperazine, bis(amino propyl) piperazine, piperidine, N-alkyl piperidines, morpholine, N-alkyl morpholine, dimer acid diamine, imidazoles, imidazolines and poly(oxy alkylene) polyamines and amidoamines from these and carboxylic acids.

3. The composition of claim 2 wherein the polyepoxide is a compound containing more than one group of the formula

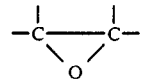

4. The composition of claim 3 wherein the polyepoxide is the liquid diglycidyl ether of Bisphenol-A.

5. The composition of claim 4 wherein the amine curing agent is aminoethylpiperazine and the non-nucleophilic acid salt is the tetrafluoroborate salt of aminoethylpiperazine.

6. The composition of claim 4 wherein the amine curing agent is diethylene triamine and the non-nucleophilic acid salt is the tetrafluoroborate salt of diethylene triamine.

7. The composition of claim 4 wherein the amine curing agent is thriethylene tetramine and the non-nucleophilic acid salt is the tetrafluoroborate salt of ethylene diamine.

8. The composition of claim 4 wherein the amine curing agent is triethylene tetramine and the non-nucleophilic acid salt is the tetrafluoroborate salt of triethylene tetramine.

9. The composition of claim 4 wherein the amine curing agent is an amido amine obtained by amidification of linoleic acid with ethylene diamine and the non-nucleophilic acid salt is the tetrafluoroborate salt of the said amido amine.

10. The composition of claim 4 wherein the amine curing agent is aminoethylpiperazine and the non-nucleophilic acid salt is the tetrafluoroborate salt of morpholine.

11. The composition of claim 4 wherein the amine curing agent is aminoethylpiperazine and the non-nucleophilic acid salt is the hexafluorophosphate salt of aminoethylpiperazine.

12. The composition of claim 4 wherein the amine curing agent is poly(oxy propylene) triamine and the non-nucleophilic acid salt is the hexafluorophosphate salt of poly(oxy propylene) triamine.

13. The composition of claim 4 wherein the amine curing agent is diethylene triamine and the non-nucleophilic acid salt is the hexafluorophosphate salt of diethyl amine.

14. The composition of claim 3 wherein the polyepoxide is a mixture of the liquid diglycidyl ether of Bisphenol-A and the diglycidyl ether of poly(oxy propylene) glycol. The amine curing agent is aminoethylpiperazine and the non-nucleophilic acid salt is the tetrafluoroborate salt of aminoethylpiperazine.

* * * * *